Patented Oct. 23, 1923.

1,471,326

UNITED STATES PATENT OFFICE.

JAMES P. COPLAND, OF HUDSON, OHIO.

WELDING ELECTRODE.

No Drawing.   Application filed November 12, 1921. Serial No. 514,760.

*To all whom it may concern:*

Be it known that I, JAMES P. COPLAND, a citizen of the United States, and a resident of Hudson, county of Summit, State of Ohio, have invented certain new and useful Improvements in Welding Electrodes, of which the following is a specification.

My invention relates to electrodes for electric welding processes, the chief object being to provide an electrode of new and improved composition and properties.

In practising my invention in an arc welding process I utilize as a terminal in an electric welding circuit an electrode composed of tungsten in predominating amounts and containing smaller amounts of chromium preferably not in excess of 30 parts by weight. Electrodes composed of tungsten and containing chromium have a low boiling point as compared with carbon thereby providing an arc considerably cooler than the carbon arc; are more resistant to the destructive and oxidizing action of an electric arc than carbon and similar electrodes in use at the present time and are sufficiently strong and ductile to withstand the usage to which the ordinary electrode is subjected in handling and in actual use.

Electrodes of my improved composition are especially suitable for use in arc welding processes wherein the electrode does not enter the weld or seam metal for increasing the amount thereof.

Although in its preferred form the composition of my improved electrode consists of tungsten and chromium, I do not wish to be limited to these metals since as an equivalent of tungsten I may use one or more of the following metals: titanium, iridium, palladium, osmium, and various other metals of similar characteristics, especially as regards boiling point.

Although for purposes of illustration I have hereinabove described my invention as embodied in an electrode for use in the arc welding process, it is to be understood that it is equally applicable to resistance welding processes, particularly spot welding.

The scope of my invention is defined by what is claimed.

What is claimed is:

1. An electrode for electric welding consisting of a metal having a relatively low boiling point as compared with carbon and containing an appreciable amount of chromium.

2. An electrode for electric welding containing chromium and tungsten.

3. An electrode for electric welding containing tungsten in a predominating amount and a substantial percentage of chromium.

4. An electrode for electric arc welding containing tungsten and about 30 per cent by weight of chromium.

In testimony whereof I hereunto affix my signature.

JAMES P. COPLAND.